B. W. DUNKLEE.
Cooking Apparatus.
No. 27,115.
Patented Feb. 14, 1860.
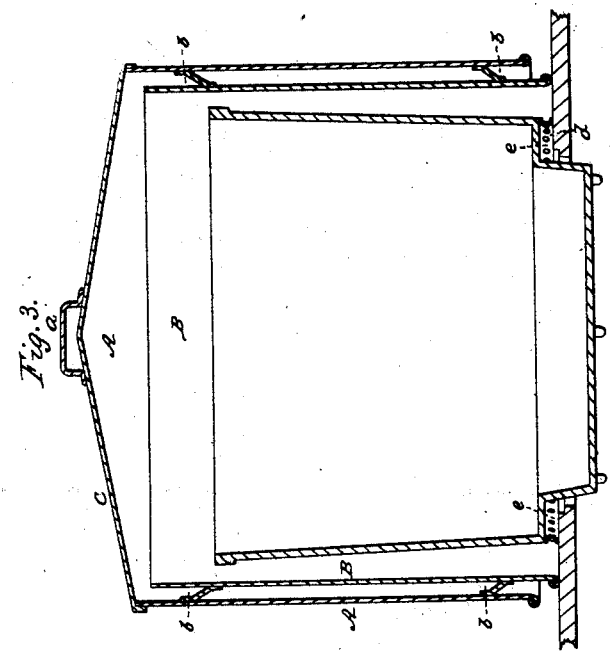
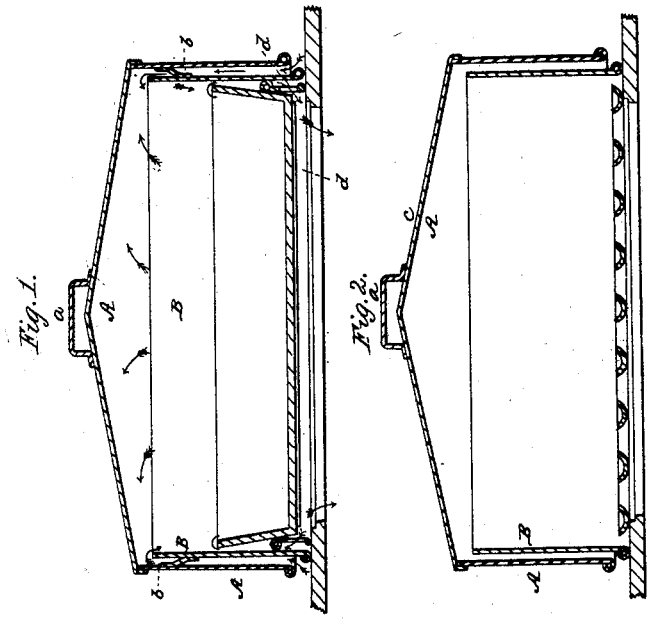
Witnesses:
William E. Smith.
Chas. F. Harriman.
Inventor:
B. Wells Dunklee

UNITED STATES PATENT OFFICE.

B. WELLS DUNKLEE, OF BOSTON, MASSACHUSETTS.

COOKING UTENSIL.

Specification of Letters Patent No. 27,115, dated February 14, 1860.

*To all whom it may concern:*

Be it known that I, B. WELLS DUNKLEE, of Boston, in the county of Suffolk and State of Massachusetts, have invented a new and useful Improvement in Ventilating or Draft Covers for the Purpose of Carrying off the Steam or Odors Arising from Cooking Utensils; and I do hereby declare that the same is fully described and represented in the following specification and the accompanying drawings, of which—

Figure 1, is a section of my invention, showing it as applied to a spider or frying vessel, and the top of a stove or range. Fig. 2, is a section showing its application to a broiler or grid-iron. Fig. 3, is a section of the same as used in connection with a boiling vessel or pot.

The object of my invention is to produce an apparatus which shall carry away the steam and disagreeable odors which rise more or less in all cooking operations, and which can not only be manufactured and sold at a very low rate, but which can be removed very easily and expeditiously from the vessel with which it may be used. Such an invention will at once recommend itself to the favorable notice of all housekeepers.

In the drawings A, denotes a tin or other metallic casing provided with a handle, *a*, for convenience in using it. The said outer casing or cover is made circular, oblong, or any other desirable shape. Within the said casing A, and confined thereto by metallic straps or arms, *b*, or any other suitable contrivance and extending below the casing A, a distance equal to about one-eighth the whole height of the casing A, and having the same distance between its outer diameter and the internal diameter of the casing A, is another casing B, the same extending nearly to the top of the casing A, or within an inch more or less thereof. I also construct an annulus or ring *d*, of iron, with a series of holes or apertures, *e*, in its periphery, the said ring being for the purpose of receiving and sustaining the cooking utensil a short distance above the top surface of the stove or range, and also for the purpose of allowing the steam or odors to be drawn into the fire.

The mode of operation of my invention is as follows: The cooking vessel having been raised from the stove by means of the ring, *d*, as above described, the cover is to be placed over the said vessel, and with its inner casing, B, resting on the top surface of the stove. The heat from the fire will cause a strong current of air to pass upward through the space between the two casings A, and B, and thence over the top of the casing B, and down through the space between the vessel and inner casing through the apertures, *e*, and into the fire as shown by the arrows in Fig. 1, thus taking with it all steam or effluvia which may rise from the cooking vessel, and carry it into the chimney or smoke flue, thereby preventing any of the said steam or effluvia from escaping into the room or kitchen.

I claim—

The cover as constructed with an outer casing A, and with an inner casing B, attached thereto substantially and for the purpose as above specified.

In testimony of which I have hereunto set my signature.

B. WELLS DUNKLEE.

Witnesses:
 WILLIAM E. SMITH,
 CHAS. F. HARRIMAN.